United States Patent [19]
Green

[11] Patent Number: 5,803,762
[45] Date of Patent: Sep. 8, 1998

[54] DATA INTERFACE ASSEMBLY

[75] Inventor: Graeme Allan Green, Mitchell, Australia

[73] Assignee: COMS21 Limited, Michell, Australia

[21] Appl. No.: 655,565

[22] Filed: May 30, 1996

Related U.S. Application Data

[63] Continuation-in-part of PCT/AU94/00735, Nov. 28, 1994.

[30] Foreign Application Priority Data

Nov. 30, 1993 [AU] Australia .................. PM2711

[51] Int. Cl.⁶ ................... G06K 7/015; G06K 19/077
[52] U.S. Cl. ..................... 439/347; 235/439; 439/911
[58] Field of Search .................. 439/347, 911; 235/441, 475, 476, 482, 439

[56] References Cited

U.S. PATENT DOCUMENTS

| | | |
|---|---|---|
| 4,575,703 | 3/1986 | Shishido . |
| 4,675,516 | 6/1987 | Guion ........................ 235/441 |
| 4,724,310 | 2/1988 | Shimamura et al. .......... 235/441 |
| 4,774,399 | 9/1988 | Fujita et al. ............... 235/441 |
| 4,984,994 | 1/1991 | Yamamoto . |
| 5,120,946 | 6/1992 | Hug et al. . |
| 5,151,847 | 9/1992 | Rautenberg . |
| 5,196,687 | 3/1993 | Sugino et al. .............. 235/441 |
| 5,463,210 | 10/1995 | Imura ....................... 439/489 |

FOREIGN PATENT DOCUMENTS

| | | |
|---|---|---|
| 2489558 | 3/1982 | France . |
| 2607290 | 5/1988 | France . |
| 3627493 | 2/1988 | Germany . |
| 63-103394 | 5/1988 | Japan ....................... 235/441 |

*Primary Examiner*—Neil Abrams
*Attorney, Agent, or Firm*—Michael D. Bednarek; Kilpatrick Stockton LLP

[57] ABSTRACT

A data interface assembly for the transfer of data between a processor unit and a smart card is disclosed which includes a receptacle 20 for receiving a smart card 10, the receptacle having electrical communication means 25 for establishing electrical communication with electrical communication means 12 on said smart card; and a solenoid 22, 26 for locking the smart card in the receptacle upon establishment of electrical communication between the respective electrical communication means. Data transfer enabling means operates in response to operation of the solenoid to allow data transfer for modifying data stored in the smart-card and/or the processor unit when the smart card is locked in the receptacle by the solenoid and to prevent such data transfer when the smart card is not locked in the receptacle by the locking means. The data transfer enabling means is activated by a photoelectric cell 24 which senses the condition of the solenoid.

7 Claims, 4 Drawing Sheets

DATA INTERFACE ASSEMBLY

INTRODUCTION

This application is a continuation-in-part application of International Patent Application PCT/AU94/00735 filed 28 Nov. 1994.

This invention relates to a data interface assembly.

This invention has particular but not exclusive application to data interface assemblies for the transfer of data between a processor unit and a smart-card and for illustrative purposes reference will be made to such application.

As used herein the expression "transfer" refers to electrical communication by any means and includes transfer of data upon contact between electrical conductors and by telecommunication systems.

As used herein the expression "smart-card" means an identification card or security access device which includes memory and circuitry enabling the memory to be read from, written to or otherwise modified. Such cards can include electrically erasable programmable read only memory (EEPROM).

DESCRIPTION OF THE PRIOR ART

Smart-cards have electrical contacts for engagement with electrical contacts in a slot, keyway or other receptacle in which the smart-card is inserted. The memory storage and processor of the smart-card can be corrupted if electrical contact between the smart-card and its host circuit is inadvertently broken once established. It is therefore desirable that electrical contact not be broken during a transaction involving use of the smart-card, either by accidental withdrawal, bumping, jolting or by any other movement which even if slight can cause chattering of the electrical contacts. Similarly if communication between the smart card and its host circuit is by telecommunication means, it is important that this communication is not interrupted until the transaction or data transfer is completed.

In some known data interface assemblies this problem is addressed by providing a motorised feed assembly which engages the smart-card, and positively feeds the smart-card into its receptacle between driven rollers or the like, holds it in place during a transaction, and positively retracts the card after use.

SUMMARY OF THE INVENTION

The present invention aims to provide an alternative data interface assembly which will be reliable and efficient in use.

This invention in one aspect resides broadly in a data interface assembly for the transfer of data between a processor unit and a smart-card, the data interface assembly including:

a receptacle for receiving the smart-card, the receptacle having electrical communication means for establishing electrical communication with electrical communication means on the smart-card; and locking means responsive to establishment of electrical communication between the respective electrical communication means for locking the smart-card in the receptacle.

In one embodiment the respective electrical communication means includes electrical contacts. Alternatively, the respective electrical communication means includes telecommunication means.

The smart-card can be locked in the receptacle by any suitable means such as, for example, clamping means driven by a motor which is activated upon detection of the electrical communication between the respective communication means, or the motor may drive a worm gear to linearly displace a bolt to lock the card in the receptacle. However, it is preferred that the locking means includes a solenoid, the smart-card being locked in the receptacle upon actuation of the solenoid in response to establishment of the electrical communication.

The solenoid may be activated to cause a bolt or other means to engage the smart-card for retention in the receptacle. In a preferred embodiment the solenoid includes an armature in the form of a plunger adapted to lockingly engage the smart-card on actuation of the solenoid.

It is preferred that the data interface assembly includes data transfer enabling means operable in response to operation of said locking means to allow data transfer for modifying data stored in the smart-card and/or the processor unit when the smart-card is locked in the receptacle by the locking means and to prevent such data transfer when the smart-card is not locked in the receptacle by the locking means.

The data transfer enabling means can be activated by a proximity detection device adapted to detect when the end of the smart-card is adjacent the end of the receptacle or, alternatively, an auxiliary electrical contact can be established when the two ends come into contact. However, it is preferred that the data transfer enabling means includes sensing means for sensing the condition of the solenoid. Suitably the sensing means senses when the plunger lockingly engages the smart-card.

The sensing means may be a proximity detector as indicated above, or the sensing means could utilise a laser beam. However, it is preferred that the sensing means includes a photoelectric device.

In another aspect this invention reside broadly in a smart-card for use with a data interface assembly as described above, said smart-card including engagement means for engagement by the locking means.

The engagement means could be a hasp or any other means suitably engageable by the locking means, but it is preferred that the engagement means is an aperture in the smart-card for receiving a plunger. Alternatively the engagement means may be a slot or a recess in the smart-card.

The data interface assembly may also include a smart-card as defined above.

In a further aspect this invention resides broadly in a data interface assembly for the transfer of data between a processor unit and a smart card, the data interface assembly including:

a receptacle for receiving the smart card, the receptacle having electrical communication means for establishing electrical communication with electrical communication means on the smart card;

locking means responsive to the smart card being received in the receptacle for locking the smart card in the receptacle, and data transfer enabling means operable in response to operation of the locking means to allow data transfer for modifying data stored in the smart card and/or the processor unit when the smart card is locked in the receptacle by the locking means and to prevent such data transfer when the smart card is not locked in the receptacle by the locking means.

BRIEF DESCRIPTION OF THE DRAWINGS

In order that this invention may be more easily understood and put into practical effect, reference will now be made to the accompanying drawings which illustrate a preferred embodiment of the invention, wherein.

DETAILED DESCRIPTION OF THE INVENTION

Figure 1:
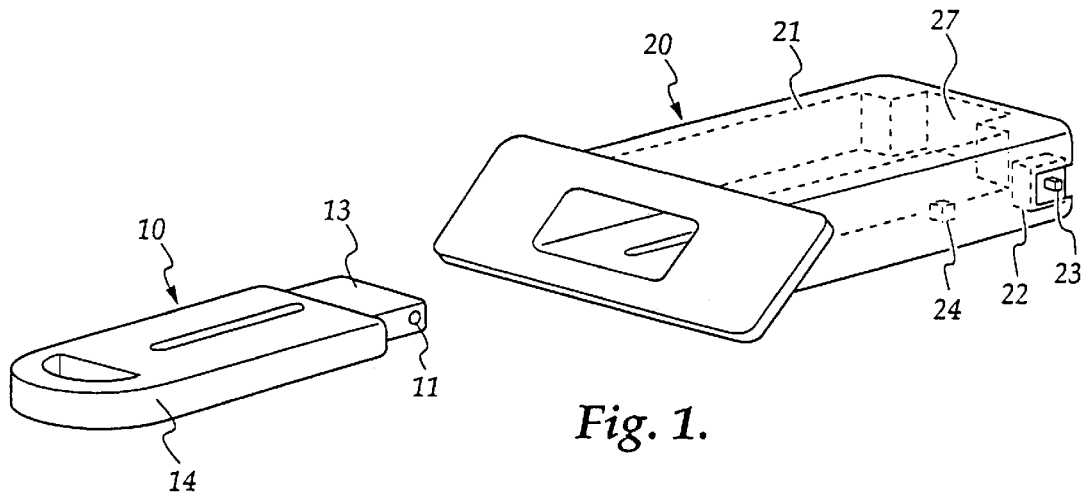
FIG. 1 is a perspective view of a smart-card and receptacle therefor.
Figure 2A:
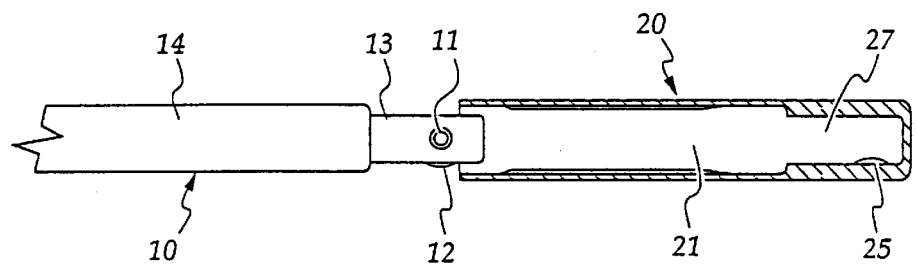
FIGS. 2A and 2B illustrate a side view of a smart-card before and upon insertion into a receptacle.
Figure 2B:
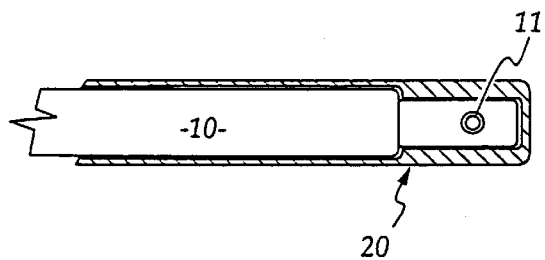

As is best seen in FIG. 1, a smart-card 10 has a main housing 14 housing a microchip processor (not shown) and an engagement projection 13 having an aperture 11 extending transversely therethrough and a pair of electrical contacts 12 on the underside (as seen in FIG. 2A). Receptacle 20 has a main slot 21 accommodating housing 14 and a recess 27 adapted to closely receive engagement projection 13. Recess 27 has a pair of electrical contacts 25 (as seen in FIG. 2A) adapted to engage with contacts 12. As card 10 is inserted in receptacle 20, the leading edges of contacts 12 and 25 engage and electrical contact is maintained during the sliding action of the contacts as engagement projection 13 becomes fully engaged in recess 27.

Figure 3A:
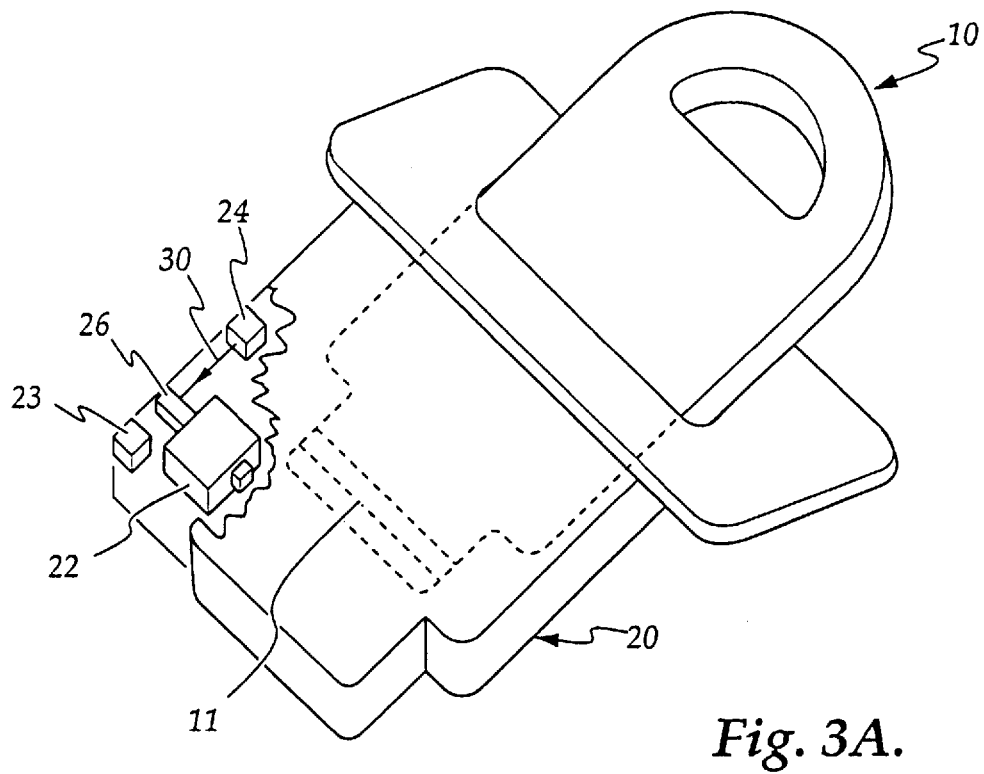
FIGS. 3A and 3B illustrate a plan view of a smart-card before and upon complete insertion into a receptacle.
Figure 3B:
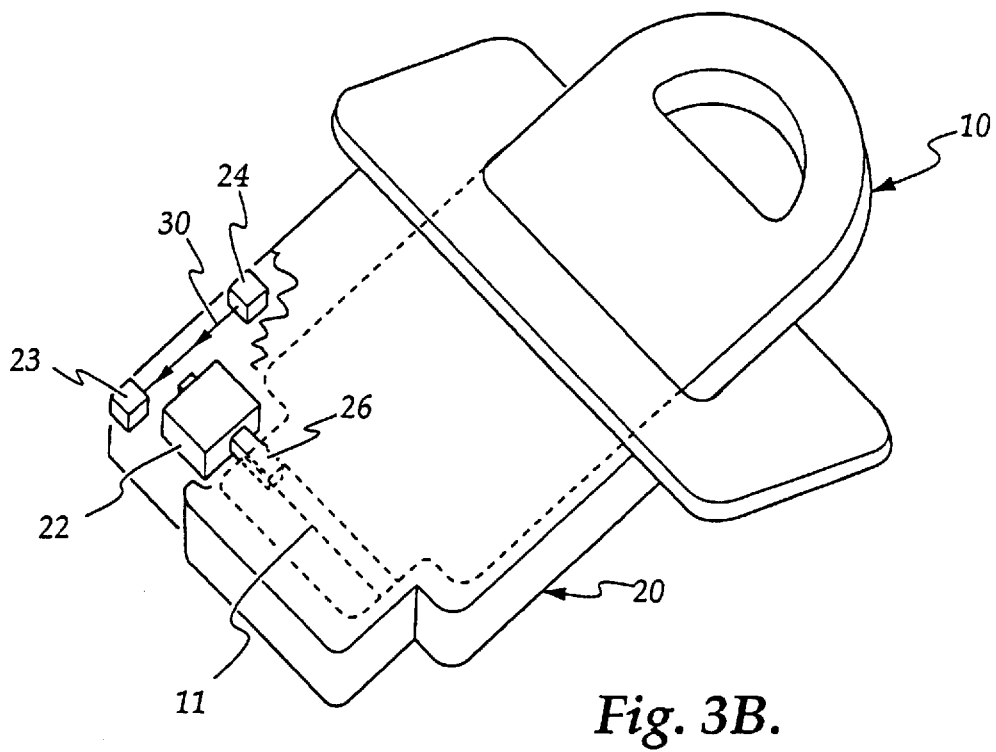

As is best seen in FIG. 3A which shows a cut-away view of receptacle 20, a solenoid 22 having a plunger armature 26 is positioned adjacent the end of recess 27 such that plunger 26 is aligned with aperture 11 in engagement projection 13 of smart-card 10 if the card is fully engaged in receptacle 20. A light source 24 is aligned with a photo-electric detector cell 23 such that a beam of light 30 is interrupted by plunger 26 when the plunger is in its retracted position (as seen in FIG. 3A), but is not interrupted when the plunger is engaged in aperture 11 (as seen in FIG. 3B). Preferably aperture 11 includes a chamfered edge for ease of insertion of the plunger 26.

Figure 4:
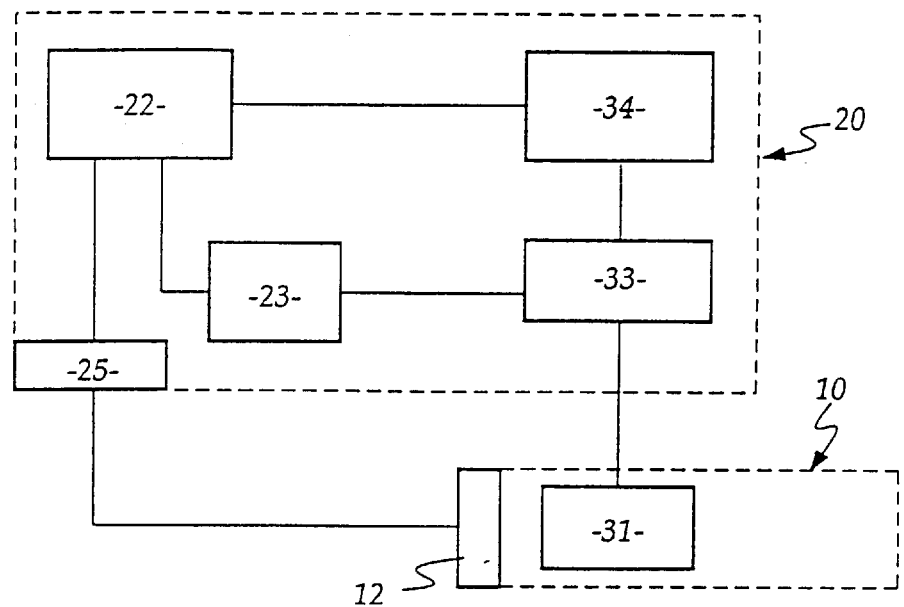
FIGS. 4 to 7 are simplified schematic block diagrams of preferred embodiments of the data interface assembly.

With reference to FIG. 4, in use smart-card 10 is inserted into receptacle 20 and electrical contacts 12 and 25 engage at their leading edge and electrical contact is maintained as card 10 becomes fully engaged in receptacle 20. Upon establishment of electrical contact, solenoid 22 is actuated and plunger 26 will engage in aperture 11 when card 10 is fully engaged in receptacle 20. This allows a beam of light 30 to be detected by photoelectric cell 23 (as seen in FIG. 3B). As the beam of light 30 is detected by photoelectric cell 23, enabling circuit 33 is actuated allowing the transfer of data between card CPU memory 31 and system CPU memory 34.

Figure 5:
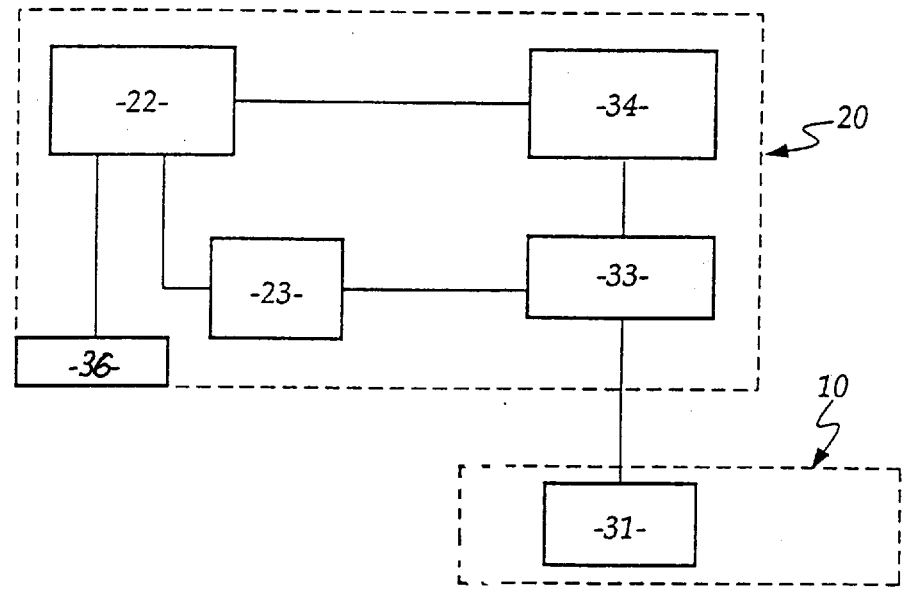
Figure 6:
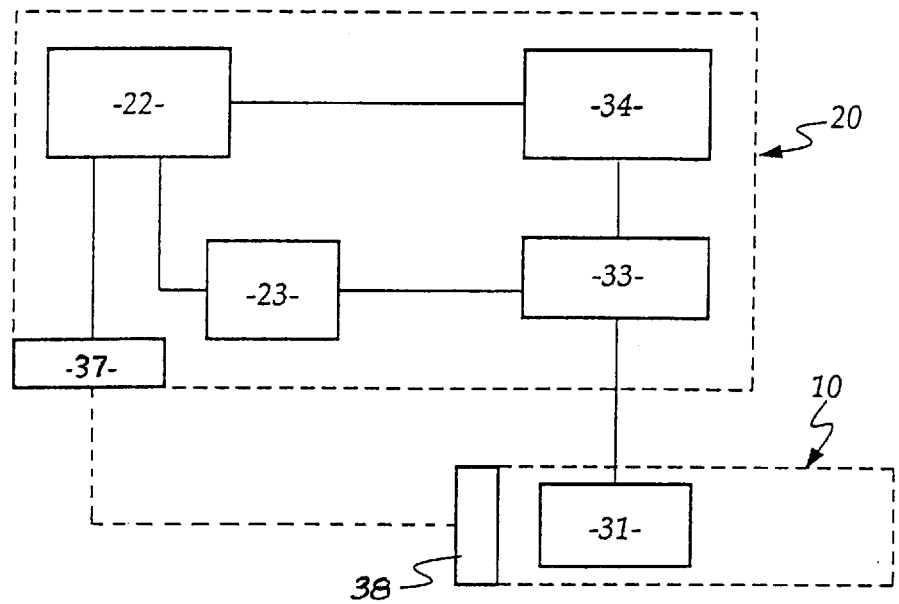

In another embodiment illustrated in FIG. 5, insertion of card 10 in receptacle 20 activates switch 36 which actuates solenoid 22. Alternatively as illustrated in FIG. 6, solenoid 22 is actuated upon establishment of electrical communication between RF telecommunications means 37 and 38 associated with receptacle 20 and card 10 respectively.

Figure 7:
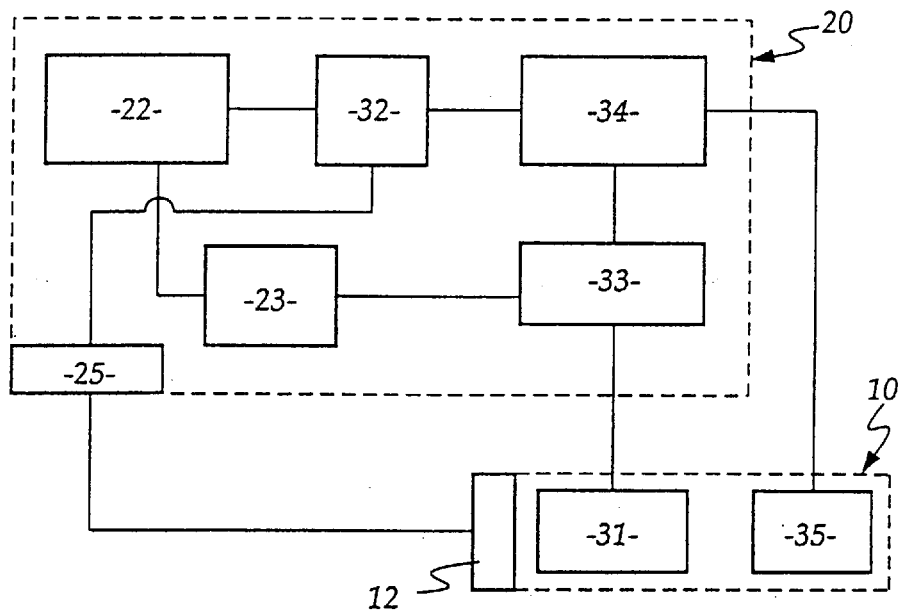

In an alternative embodiment with reference to FIG. 7, card 10 contains basic card data 35 such as identification of the establishment where the key assembly is valid or acceptable. As card 10 is being inserted to become fully engaged in receptacle 20, a basic data check 32 is actuated. If the basic data is in order, solenoid 22 is actuated and the system proceeds as hereinbefore described.

The data interface assembly of the present invention, unlike known motorised feed assemblies requires relatively little maintenance, is simple to repair and/or replace, and is thus relatively inexpensive and efficient in use.

Furthermore, because the smart-card is locked within the receptacle, there is no possibility of chattering due to breaking of electrical communication between the card and receptacle, for example, if the card is accidentally bumped or jolted in use.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

I claim:

1. A data interface assembly for the transfer of data between a processor unit and a smart card, said data interface assembly including:

a receptacle for receiving said smart card, said receptacle having electrical communication means for establishing electrical communication with electrical communication means on said smart card;

locking means responsive to establishment of electrical communication between said respective electrical communication means for locking said smart card in said receptacle, and data transfer enabling means operable in response to operation of said locking means to allow data transfer for modifying data stored in said smart card and/or said processor unit when said smart card is locked in said receptacle by said locking means and to prevent such data transfer when said smart card is not locked in said receptacle by said locking means;

wherein said data transfer enabling means includes sensing means for sensing the condition of said locking means.

2. A data interface assembly as claimed in claim 1, wherein said respective electrical communication means includes electrical contacts.

3. A data interface assembly as claimed in claim 1, wherein said respective electrical communication means includes telecommunication means.

4. A data interface assembly as claimed in claim 1, wherein said locking means includes a solenoid, said smart card being locked in said receptacle upon actuation of said solenoid in response to establishment of said electrical communication.

5. A data interface assembly as claimed in claim 4, wherein said solenoid includes an armature in the form of a plunger adapted to lockingly engage said smart card upon actuation of said solenoid.

6. A data interface assembly as claimed in claim 5, wherein said sensing means senses when said plunger lockingly engages said smart card.

7. A data interface assembly as claimed in claim 6, wherein said sensing means is a photoelectric device.

* * * * *